United States Patent
Kim

(10) Patent No.: US 8,581,544 B2
(45) Date of Patent: Nov. 12, 2013

(54) CHARGING APPARATUS FOR VEHICLE AND CONTROLLING METHOD THEREOF

(75) Inventor: Dong Ok Kim, Yongin (KR)

(73) Assignee: Hyundai Motor Company, Seoul (KR)

( * ) Notice: Subject to any disclaimer, the term of this patent is extended or adjusted under 35 U.S.C. 154(b) by 389 days.

(21) Appl. No.: 12/952,026

(22) Filed: Nov. 22, 2010

(65) Prior Publication Data

US 2012/0056581 A1 Mar. 8, 2012

(30) Foreign Application Priority Data

Sep. 7, 2010 (KR) .................. 10-2010-0087484

(51) Int. Cl.
*H02J 7/00* (2006.01)

(52) U.S. Cl.
USPC .......................................... 320/109; 320/113

(58) Field of Classification Search
USPC .......................................................... 320/109
See application file for complete search history.

(56) References Cited

U.S. PATENT DOCUMENTS

| | | | | |
|---|---|---|---|---|
| 5,367,556 A | * | 11/1994 | Marui et al. | 455/569.2 |
| 5,479,479 A | * | 12/1995 | Braitberg et al. | 455/404.1 |
| 5,677,614 A | * | 10/1997 | Ohmori et al. | 320/103 |
| 6,100,670 A | * | 8/2000 | Levesque | 320/150 |
| 6,559,759 B2 | * | 5/2003 | Chien et al. | 340/425.5 |
| 2003/0155887 A1 | * | 8/2003 | Bourilkov et al. | 320/104 |
| 2004/0214525 A1 | | 10/2004 | Ahn et al. | |
| 2005/0086100 A1 | * | 4/2005 | Yanagisawa et al. | 705/13 |
| 2005/0251618 A1 | * | 11/2005 | Nonaka et al. | 711/103 |
| 2006/0208692 A1 | * | 9/2006 | Kejha | 320/103 |
| 2007/0185728 A1 | * | 8/2007 | Schwarz et al. | 705/1 |
| 2007/0230736 A1 | | 10/2007 | Boesen | |
| 2008/0019082 A1 | * | 1/2008 | Krieger et al. | 361/679 |
| 2008/0303481 A1 | * | 12/2008 | Silverbrook | 320/115 |
| 2009/0104946 A1 | | 4/2009 | Khandourl | |
| 2009/0240427 A1 | * | 9/2009 | Siereveld et al. | 701/201 |
| 2009/0243518 A1 | * | 10/2009 | Itoh | 318/98 |
| 2009/0292851 A1 | | 11/2009 | Mead et al. | |
| 2010/0007711 A1 | | 1/2010 | Bell | |
| 2010/0323657 A1 | * | 12/2010 | Barnard et al. | 455/404.1 |
| 2011/0131358 A1 | * | 6/2011 | Ganesh et al. | 710/304 |

FOREIGN PATENT DOCUMENTS

| | | |
|---|---|---|
| KR | 2007-0110987 A | 11/2007 |
| KR | 10-2008-0038760 A | 5/2008 |
| WO | 2010/019929 A1 | 2/2010 |

* cited by examiner

*Primary Examiner* — Arun Williams
(74) *Attorney, Agent, or Firm* — Edwards Wildman Palmer LLP; Peter F. Corless

(57) ABSTRACT

An apparatus for charging a portable device battery with a vehicle battery is provided. The apparatus includes a storage, a voltage monitor for monitoring voltage of the vehicle battery, a portable device connector, and a charging controller. The storage stores a charging table in which charging quantity ratios of the portable device battery to voltage bandwidths of the vehicle battery are written. The charging controller controls the connector so that the portable battery is charged to a desired value of voltage that corresponds to the monitored voltage in the charging table. With this apparatus, it is possible to charge conveniently, among others.

14 Claims, 4 Drawing Sheets

CHARGING APPARATUS FOR VEHICLE AND CONTROLLING METHOD THEREOF

CROSS-REFERENCES TO RELATED APPLICATIONS

This application claims under 35 U.S.C. §119(a) the benefit of Korean patent application number 10-2010-0087484, filed on Sep. 7, 2010, which is incorporated by reference in its entirety.

BACKGROUND

1. Field of the Disclosure

The present disclosure relates to a charging apparatus for a vehicle. More particularly, the present disclosure relates to a vehicle-mounted charging apparatus adapted to periodically monitor the voltage of a battery of a vehicle and control, when a portable device necessary to charge is sensed, the charging quantity of a battery of the portable device on the basis of the monitored voltage of the vehicle battery, as well as a controlling method thereof.

2. Description of the Related Art

A battery used in a vehicle must be in an adequate charge state in order to improve the stability, the lifespan, and the output. It is thus necessary to frequently check and manage the state of the vehicle battery such as SOC (state-of-charge) and SOH (state-of-health). To this end, many vehicle-mounted charging apparatuses have been proposed.

The conventional vehicle-mounted charging apparatuses, however, can charge a portable device battery with a voltage from a vehicle battery only in a start operation state or an ACC (Accessory On) state of the vehicle. Also, the vehicle-mounted charging apparatuses can cause the vehicle battery to be fully discharged when a portable device battery is charged in the ACC state of the vehicle. Moreover, the vehicle-mounted charging apparatuses are configured not to provide a current voltage of the vehicle battery.

The above information disclosed in this Background section is only for enhancement of understanding of the background of the invention and therefore it may contain information that does not form the prior art that is already known in this country to a person of ordinary skill in the art.

BRIEF SUMMARY

An aspect of the present invention provides a vehicle-mounted charging apparatus for charging a portable device battery with a vehicle battery. The apparatus includes a storage, a voltage monitor, a portable device connector, and a charging controller. The storage stores a charging table in which charging quantity ratios of the portable device battery to voltage bandwidths of the vehicle battery are written. The voltage monitor monitors voltage of the vehicle battery at a predetermined time interval. The portable device connector receives the portable device and charges the portable device battery by using voltage of the vehicle battery. The charging controller senses the portable device received by the portable device connector and controls the portable device connector so that the portable device battery is charged using voltage of the vehicle battery to a voltage value that corresponds to the monitored voltage of the vehicle battery in the charging table.

Another aspect of the present invention provides a method for charging a portable device battery with a vehicle battery. The method comprises: monitoring voltage of the vehicle battery using a voltage monitor; retrieving a charging quantity ratio corresponding to the monitored voltage of the vehicle battery from a charging table in which charging quantity ratios to voltage bandwidths of the vehicle battery are written, when the portable device is sensed by a charging controller; and charging the portable device battery with the vehicle battery through a portable device connector until the portable device battery is charged to a voltage value to meet the retrieved charging quantity ratio.

The above and other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

The above objects, features and advantages will be, or will become, apparent to one with skill in the art upon examination of the following figures and detailed description. As such, technical subject matters of the present invention can be easily implemented by one with skill in the art. Also, in the description of the present invention, the related art, which is known to one with skill in the art, to the present invention will be omitted in case that there is possibility that it makes the subject matter of the present invention to be indistinct without necessity. Reference will now be made in detail to the embodiments of the present invention, examples of which are illustrated in the accompanying drawings.

Figure 1:
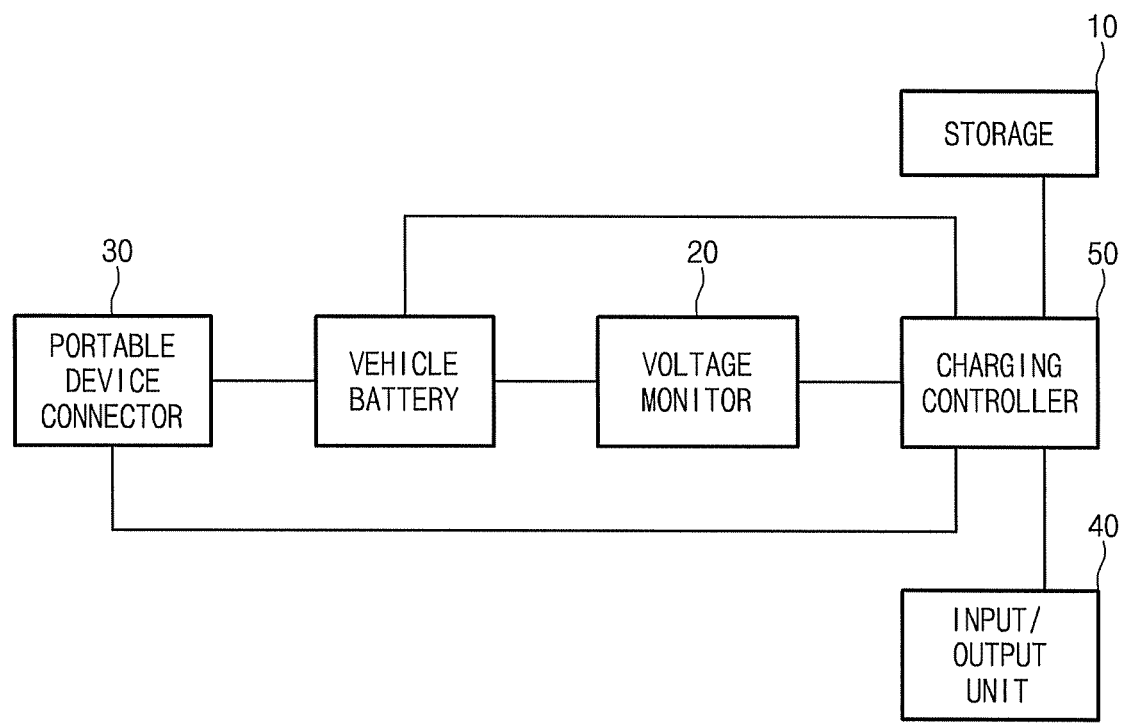
FIG. 1 is a configuration diagram of a vehicle-mounted charging apparatus according to an embodiment of the present invention.

FIG. 1 is a configuration diagram of a vehicle-mounted charging apparatus according to an embodiment of the present invention.

As shown in FIG. 1, a vehicle-mounted charging apparatus includes a storage 10, a voltage monitor 20, a portable device connector 30, an input/output unit 40, and a charging controller 50.

The storage 10 stores a charging table in which ratios of charging quantity of a portable device battery with respect to voltage bandwidths of a vehicle battery are written. Table 1 shows an example of the charging table.

TABLE 1

| Voltage of vehicle battery (V) | Charging quantity ratio of portable device battery (%) |
| --- | --- |
| Excess 14~below 14.7 | 100 |
| Excess 13~below 14 | 92.8 |
| Excess 12~below 13 | 85.7 |
| Excess 11~below 12 | 78.5 |
| below 11 | No charge |

For illustration, the voltage of a vehicle battery when fully charged is 14.7V and the voltage of the vehicle when fully discharged is 9 V. The minimum voltage necessary to start the operation of the vehicle is about 10.5~11V. Accordingly, as shown in Table 1, a portable device battery is prevented from being charged at a vehicle battery voltage of 11V or lower.

For example, it is assumed that the portable device is a cellular phone. A typical battery of the cellular phone (hereinafter, "cellular phone battery") has a full charge voltage of 4.2V and a full discharge voltage of 3V. The minimum voltage of the cellular phone battery necessary for call services is 3.3V.

In case where the voltage of the vehicle battery is higher than 11V and not higher than 12, if the cellular phone battery has a voltage higher than 3.3V before being charged, the cellular phone battery is prevented from being charged and if the cellular phone battery has a voltage lower than 3.3V, the cellular phone battery can be charged only up to 3.3V corresponding to 78.5% of its full charged voltage (4.2V) according to Table 1.

As the charging capacity of the vehicle battery is much larger than that of the cellular phone battery, the voltage of the vehicle battery hardly becomes lower than 11V even though the vehicle battery with the voltage of 11V is used to raise the voltage of the cellular phone battery from 3.0V to 3.3V.

In case where the voltage of the vehicle battery is higher than 12V and not higher than 13V, the cellular phone battery can be charged up to 3.6V, which corresponds to 85.7% of its full charge voltage, using the voltage of the vehicle battery. However, if the cellular phone battery has a voltage higher than 3.6V before being charged, the charge of the cellular phone battery is prevented.

In case where the voltage of the vehicle battery is higher than 13V and not higher than 14V, the cellular phone battery can be charged up to a voltage of 3.9V, which corresponds to 92.8% of its full charge voltage, using the voltage of the vehicle battery. However, if the cellular phone battery has a voltage higher than 3.9V before being charged, the charge of the cellular phone battery is prevented.

In case where the voltage of the vehicle battery is higher than 14V and not higher than 14.7V, the cellular phone battery can be charged up to 4.2V, which corresponds to 100% of its full charge voltage, using the voltage of the vehicle battery. However, if the cellular phone battery is in a full charged state before being charged, the charge of the cellular phone battery is prevented.

The voltage monitor 20 monitors the voltage of the vehicle battery in real-time at a predetermined time interval and applies the monitored resultant to the charging controller 50. To this end, the voltage monitor 20 includes a voltage measuring device configured to measure the voltage of the vehicle battery, and an A/D (analog-to-digital) converter configured to convert the voltage measured by the voltage measuring device into a digital value. The voltage monitor 20 measures the voltage of the vehicle battery at a predetermined time interval and converts the measured voltage into the digital value. The converted digital voltage value is transmitted to the charging controller 50.

The portable device connector 30 transmits the voltage of the vehicle battery to the portable device battery under the control of the charging controller 50. Also, the portable device connector 30 transforms the voltage of the vehicle battery into a charging voltage for the portable device battery. The transformed voltage is applied from the connector 30 to the portable device battery. The portable device connector 30 shields the transformed voltage from being applied to the portable device battery under the control of the charging controller 50 when the portable device battery is charged to meet the preset charging quantity ratios as shown in Table 1.

The input/output unit 40 includes an input portion configured with a key pad, a touch screen and so on, and an output portion configured with a speaker, a display device and so on. The input/output unit 40 outputs a question of "whether it is necessary to charge or not," through the display device and speaker under the control of the charging controller 50. Also, the input/output unit 40 inputs an answer, such as "yes" or "no" to the question from the driver (or the user) through the input portion. Furthermore, the input/output unit 40 either voice-outputs a current voltage of the vehicle battery through the speaker, or displays the current voltage of the vehicle battery on a predetermined portion of the screen of the display device, under the control of the charging controller 50.

When a portable device is connected to the portable device connector 30, the charging controller 50 senses the portable device. If the portable device is necessary to be charged, the charging controller 50 controls the portable device connector 30 so that the portable device battery is charged to a voltage determined by using the charging table stored in the storage 10 and the voltage of the vehicle battery monitored by the voltage monitor 20.

Also, the charging controller 50 controls the input/output unit 40 to output the voltage of the vehicle battery monitored by the voltage monitor 20 in audibly, visually, or both.

Alternatively, the charging controller 50 can check the voltage of the vehicle battery, which is monitored by the voltage monitor 20, and can control the portable device connector 30 to apply the voltage of the vehicle battery to the portable device battery until the voltage of the vehicle battery is lowered to a critical value (for example, 11V). The critical value is previously stored in the storage 10.

In this case, when the portable device battery is fully charged before the voltage of the vehicle battery is lowered to the critical value, the charge of the portable device battery may be prevented by an overcharge prevention function of the charging circuit within the portable device. The detailed description of the charging prevention function will be omitted because the charging prevention function is well known.

The charging controller 50 may obtain the charging quantity ratio of the portable device battery from a calculating module of battery voltage residue provided in the portable device.

Figure 2:
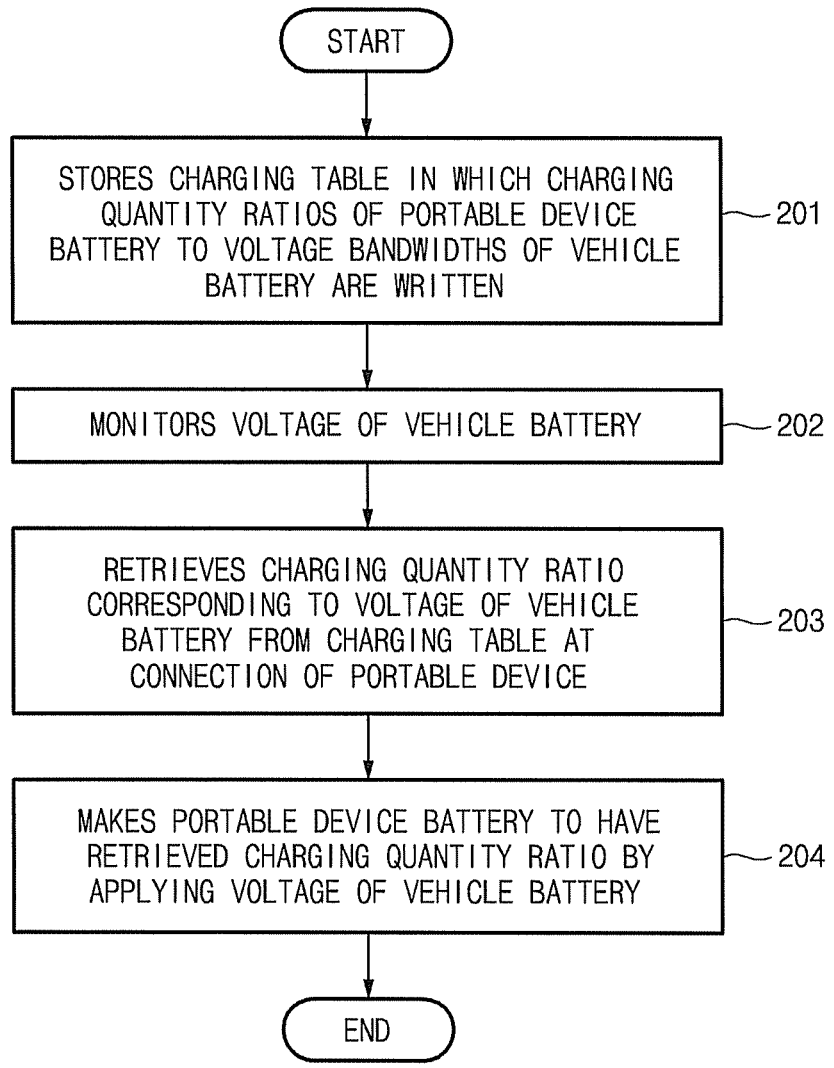
FIG. 2 is a flow chart of a charging control method according to an embodiment of the present invention.

FIG. 2 is a flow chart of a charging control method, which can be applied to the above-described vehicle-mounted charging apparatus, according to an embodiment of the present invention.

A charging table including charging quantity ratios for each of voltage bandwidths of the vehicle battery is stored in the storage 10 (step 201).

The voltage of the vehicle battery is monitored by the voltage monitor 20 (step 202).

When a portable device with a battery (necessary to be charged) is connected and sensed, the charging controller 50 retrieves from the charging table in the storage 10 a charging quantity ratio corresponding to the monitored voltage of the vehicle battery (step 203).

The portable device connector 30 applies the voltage of the vehicle battery to the portable device battery until the portable device battery is charged according to the retrieved charging quantity ratio (step 204).

The charging controller 50 allows the monitored voltage of the vehicle battery to be output audibly, visually, or both.

Figure 3:
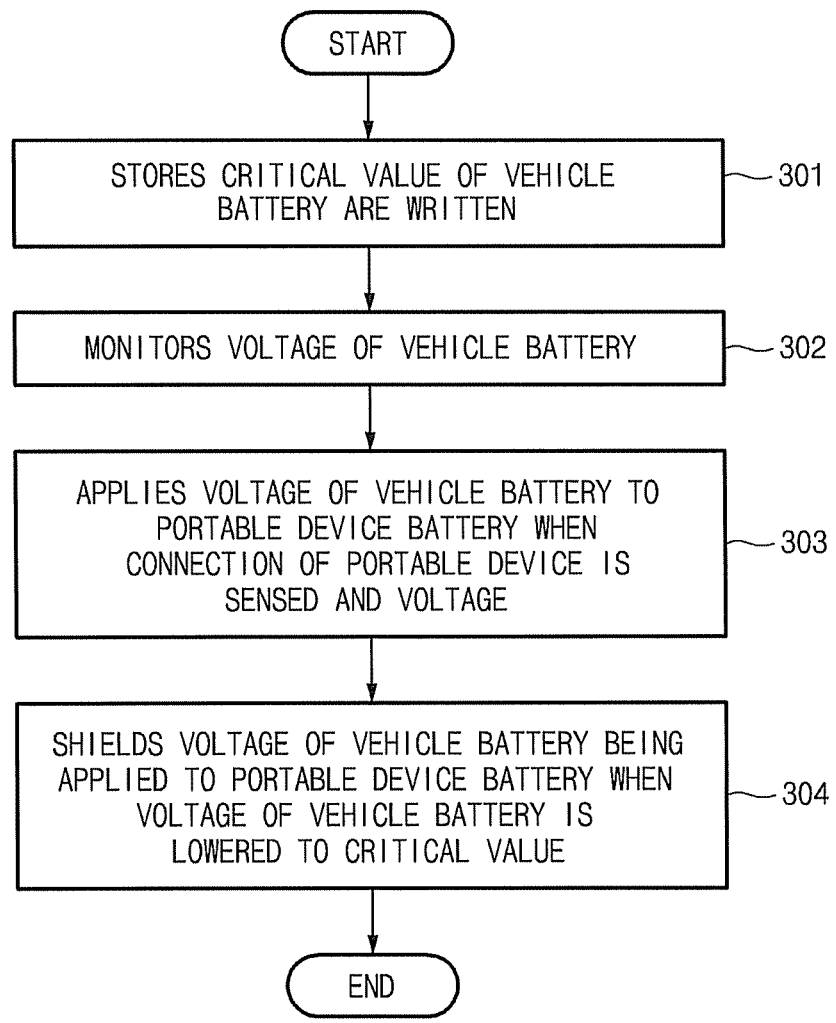
FIG. 3 is a flow chart of a charging control method according to another embodiment of the present invention.

FIG. 3 is a flow chart of a charging control method, which can be applied to the above-described vehicle-mounted charging apparatus, according to another embodiment of the present invention.

A critical value (for example, 11V) for the vehicle battery is previously stored in the storage 10 (step 301).

The voltage of the vehicle battery is monitored by the voltage monitor 20 (step 302).

When a portable device with a battery (necessary to be charged) is connected and sensed, the charging controller 50 checks whether the voltage of the vehicle battery is higher than the critical value or not. If the voltage of the vehicle battery is higher than the critical value, the voltage of the vehicle battery is applied to the portable device battery (step 303). On the contrary, when the voltage of the vehicle battery is not higher than the critical value, the voltage of the vehicle battery does not apply to the portable device battery.

When the voltage of the vehicle battery is lowered to the critical value (for example, 11V), the voltage of the vehicle battery being applied to the portable device battery is shielded.

Figure 4:
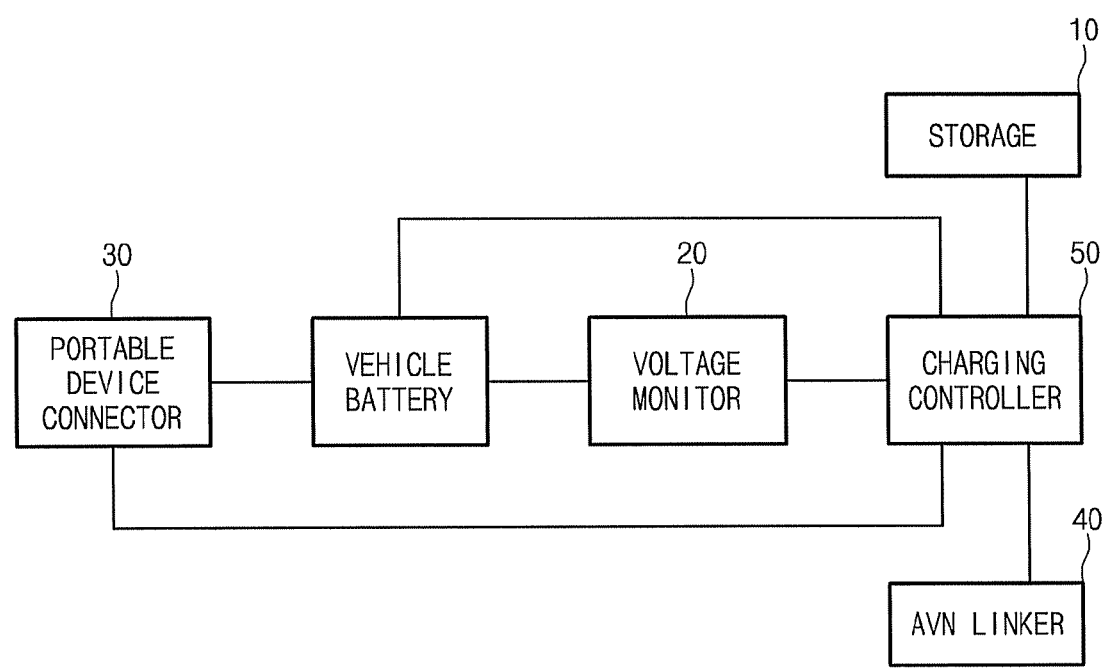
FIG. 4 is a configuration diagram of a vehicle-mounted charging control apparatus according to another embodiment of the present invention.

FIG. 4 is a configuration diagram of a charging control apparatus for a vehicle according to another embodiment of the present invention.

A charging apparatus for vehicle according to another embodiment of the present invention, which is shown in FIG. 4, is the same configuration as that according to the embodiment of FIG. 1, except that it includes an AVN (Audio video navigation) linker 60 instead of the input/output unit 40. As such, the charging controller 50 in FIG. 4 differently functions from that in FIG. 1. However, the storage 10, the voltage monitor 20, and the portable device connector 30 in FIG. 4 have the same function as those in FIG. 1. Moreover, the function of the charging controller 50 included in the charging apparatus of FIG. 4 can be performed by a electronic control unit ECU of the vehicle.

The AVN linker 60 activates an AVN system (not shown) using a first control signal from the charging controller 50. When an answer is input by a user, the AVN linker 60 transmits a second control signal from the charging controller 50 to the AVN system, thereby deactivating the AVN system. Alternatively, the AVN system can be implemented to operate in a different manner by adding a modified algorithm. That is, the AVN system is activated by the first control signal, and when an answer is input from a user, the input answer is transmitted to the charging controller 50 via the AVN linker 60, the activated AVN system then being automatically deactivated.

The charging controller 50 transmits the first control signal to the AVN system through the AVN linker 60 so as to activate the AVN system. Also, the charging controller 50 receives an answer, such as "yes" or "no" to a question of "whether or not it is necessary to charge" from a user via the AVN system and the AVN linker 60, after outputting the question through the AVN linker 60 and the AVN system to the user.

Also, the charging controller 50 allows a current voltage of the vehicle battery to be output audibly, visually, or both through the AVN system, after activating the AVN system by transmitting the first control signal to the AVN system via the AVN linker 60. In this case, the charging controller 50 can either activate the AVN system until a voltage being applied to the portable device battery is shielded, or deactivate the AVN system by applying the second control signal to AVN system after the current voltage of the vehicle battery is output audibly, visually, or both.

A typically known AVN system includes a user interface unit, an audio processor, a display device, a control unit, and so on. The user interface unit includes a key pad and a touch screen. The audio processor is used to voice-output a variety of information. The display device is used to display a variety of information its screen. The control unit is used for control the operation of the AVN system.

The above methods according to the present invention can be provided in a computer program. Code words and segments included in the program can be easily expected by computer-programmers skilled in the art. The provided program is stored in a computer-readable record medium (an information storing medium). As such, the program stored in the record medium is read and executed by a computer so that the above method according to the present invention is implemented. The record medium includes every type of computer-readable record medium.

As described above, the apparatuses and methods according the present invention periodically monitor the voltage state of the vehicle battery and control the charging quantity of the portable device battery on the basis of the monitored voltage of the vehicle battery when a portable device with the battery, which needs to be charged, is sensed, thereby allowing the portable device battery to be charged conveniently and without causing a full discharge of the vehicle battery.

It will be apparent to those skilled in the art that various modifications and variations can be made within a scope being not out of the technical subject matter of the present invention. Thus, it is intended that the present invention cover the modifications and variations of this invention provided they come within the scope of the appended claims and their equivalents.

What is claimed is:

1. A vehicle-mounted charging apparatus for charging a portable device battery with a vehicle battery, comprising:
    a storage storing a charging table in which charging quantity ratios of the portable device battery to voltage bandwidths of the vehicle battery are written;
    a voltage monitor monitoring voltage of the vehicle battery at a predetermined time interval;
    a portable device connector receiving the portable device and charging the portable device battery by using voltage of the vehicle battery; and
    a charging controller sensing the portable device received by the portable device connector and controlling the portable device connector so that the portable device battery is charged using voltage of the vehicle battery to a voltage value that corresponds to the monitored voltage of the vehicle battery in the charging table.

2. The vehicle-mounted charging apparatus of claim 1, wherein the charging controller further controls the portable device connector to charge the portable device battery until voltage of the vehicle battery becomes lowered to a critical voltage.

3. The vehicle-mounted charging apparatus of claim 1, further comprises an output unit,
    wherein the charging controller outputs voltage of the vehicle battery through the output unit.

4. The vehicle-mounted charging apparatus of claim 1, wherein the voltage monitor includes:

a voltage measuring device measuring voltage of the vehicle battery; and an analog-to-digital converter converting the measured voltage into a digital value.

5. The vehicle-mounted charging apparatus of claim 1, further comprises an audio video navigation linker, wherein the charging controller is associated with an audio video navigation system through audio video navigation to output the voltage of the vehicle battery.

6. The vehicle-mounted charging apparatus of claim 2, further comprises an output unit, wherein the charging controller outputs voltage of the vehicle battery through the output unit.

7. The vehicle-mounted charging apparatus of claim 2, wherein the voltage monitor includes:

a voltage measuring device measuring voltage of the vehicle battery; and an analog-to-digital converter converting the measured voltage measured into a digital value.

8. The vehicle-mounted charging apparatus of claim 2, further comprises an audio video navigation linker, wherein the charging controller is associated with an audio video navigation system through an audio video navigation linker to output voltage of the vehicle battery.

9. The vehicle-mounted charging apparatus of claim 8, wherein the audio video navigation linker activates the audio video navigation system using a first control signal from the charging controller, and deactivates the audio video navigation system using a second control signal from the charging controller.

10. The vehicle-mounted charging apparatus of claim 9, wherein the charging controller activates the audio video navigation system until the voltage being applied to the portable device battery is shielded.

11. A method for charging a portable device battery with a vehicle battery, comprising:

monitoring voltage of the vehicle battery using a voltage monitor;

retrieving a charging quantity ratio corresponding to the monitored voltage of the vehicle battery from a charging table in which charging quantity ratios to voltage bandwidths of the vehicle battery are written, when the portable device is sensed by a charging controller; and charging the portable device battery with the vehicle battery through a portable device connector until the portable device battery is charged to a voltage value to meet the retrieved charging quantity ratio.

12. The method of claim 11, further comprises enabling the monitored voltage of the vehicle battery to be output audibly, visually, or both.

13. The method of claim 11, further comprises enabling the monitored voltage of the vehicle battery to be output audibly, visually, or both by associating with an audio video navigation system through an audio video navigation linker.

14. The method of claim 13, wherein the audio video navigation system is activated until the charging is stopped.

* * * * *